United States Patent
Merrill, III

(10) Patent No.: US 9,928,034 B2
(45) Date of Patent: Mar. 27, 2018

(54) WORK-EFFICIENT, LOAD-BALANCED, MERGE-BASED PARALLELIZED CONSUMPTION OF SEQUENCES OF SEQUENCES

(71) Applicant: NVIDIA Corporation, Santa Clara, CA (US)

(72) Inventor: Duane George Merrill, III, Charlottesville, VA (US)

(73) Assignee: NVIDIA Corporation, Santa Clara, CA (US)

(*) Notice: Subject to any disclaimer, the term of this patent is extended or adjusted under 35 U.S.C. 154(b) by 70 days.

(21) Appl. No.: 14/971,999

(22) Filed: Dec. 16, 2015

(65) Prior Publication Data

US 2016/0179574 A1 Jun. 23, 2016

Related U.S. Application Data

(60) Provisional application No. 62/093,380, filed on Dec. 17, 2014.

(51) Int. Cl.
*G06F 9/50* (2006.01)
*G06F 7/523* (2006.01)
*G06F 15/16* (2006.01)

(52) U.S. Cl.
CPC ............ *G06F 7/523* (2013.01); *G06F 9/5066* (2013.01); *G06F 15/16* (2013.01); *G06F 2209/5018* (2013.01)

(58) Field of Classification Search
CPC .................................................. G06F 9/5066
See application file for complete search history.

(56) References Cited

U.S. PATENT DOCUMENTS

2017/0123849 A1* 5/2017 Tian ...................... G06F 9/4881

OTHER PUBLICATIONS

Greathouse, Joseph L., and Mayank Daga. "Efficient sparse matrix-vector multiplication on GPUs using the CSR storage format." Proceedings of the International Conference for High Performance Computing, Networking, Storage and Analysis. IEEE Press, Nov. 16-21, 2014.*
Green, Oded, Robert McColl, and David A. Bader. "GPU merge path: a GPU merging algorithm." Proceedings of the 26th ACM international conference on Supercomputing. ACM, 2012.*
22A-2 Summer 2014, Lecture 2, UC Davis, Summer 2014.*
Baxter, S. et al., "Efficient Merge, Search, and Set Operations on GPU," GPU Technology Conference, 2013, pp. 1-24.
Odeh, S. et al., "Merge Path—Parallel Merging Made Simple," IEEE Computer Society, 2012, pp. 1116-1118.

* cited by examiner

*Primary Examiner* — Charlie Sun
(74) *Attorney, Agent, or Firm* — Zilka-Kotab, PC

(57) ABSTRACT

A method, computer readable medium, and system are disclosed for processing a segmented data set. The method includes the steps of receiving a data structure storing a plurality of values segmented into a plurality of sequences; assigning a plurality of processing elements to process the plurality of values; and processing the plurality of values by the plurality of processing elements according to a merge-based algorithm. Each processing element in the plurality of processing elements identifies a portion of values in the plurality of values allocated to the processing element based on the merge-based algorithm. In one embodiment, the processing elements are threads executed in parallel by a parallel processing unit.

20 Claims, 12 Drawing Sheets

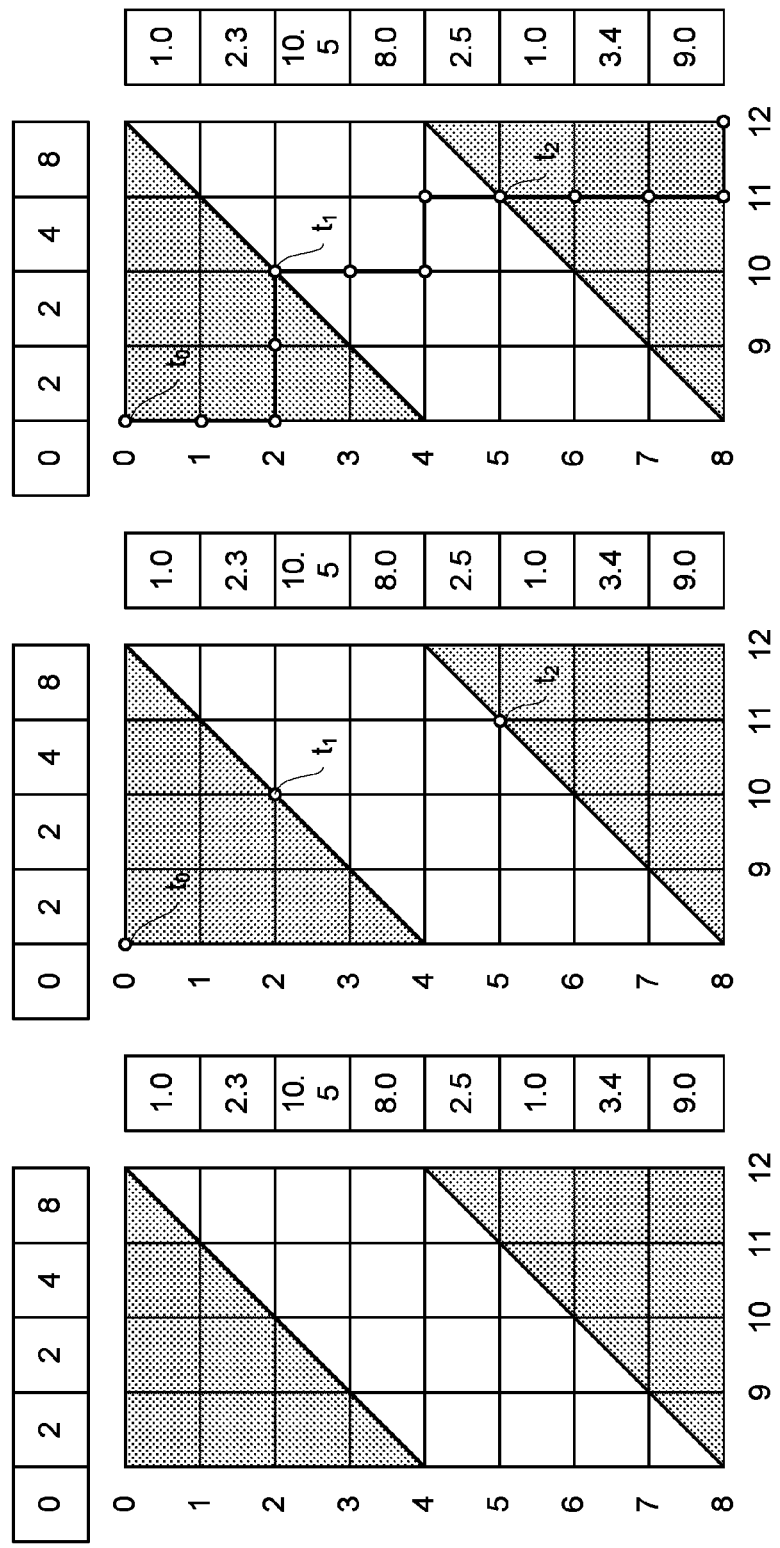

US 9,928,034 B2

WORK-EFFICIENT, LOAD-BALANCED, MERGE-BASED PARALLELIZED CONSUMPTION OF SEQUENCES OF SEQUENCES

CLAIM OF PRIORITY

This application claims the benefit of U.S. Provisional Application No. 62/093,380 titled "Work-Efficient, Load-Balanced, Merge-Based Parallelized Consumption of Sequences of Sequences," filed Dec. 17, 2014, the entire contents of which is incorporated herein by reference.

This invention was made with Government support under Agreement No. HR0011-13-3-0001 awarded by DARPA. The Government has certain rights in this invention.

FIELD OF THE INVENTION

The present invention relates to parallel algorithms, and more particularly to processing segmented data (sequences of sequences).

BACKGROUND

There are many computational algorithms for processing segmented data, examples of which may include segmented reduction and sparse matrix vector multiplication (SpMV). These algorithms are typically implemented on massively parallel processors. Typically, the input data is divided and each portion of the data is allocated to a different processor. However, it is particularly difficult to balance the workload from the diverse datasets. For example, many real-world datasets include a majority of short or zero-length segments accompanied by a minority of segments having a length that is orders of magnitude larger than the other segments. Thus, many processors assigned short or zero-length segments will have very few computations to perform, while a few processors assigned to the longer segments will perform most of the work.

Contemporary parallel decomposition strategies are inadequate because data sets are typically divided based on a single component of the data. For example, a dataset in the form of a matrix may be divided by row or column. In another example, a dataset in the form of a number of variable length lists may be divided evenly by list index. These decomposition strategies fail to balance the workload based on, for example, the computational complexity of each of the segments assigned to each processor. Thus, there is a need for addressing these issues and/or other issues associated with the prior art.

SUMMARY

A method, computer readable medium, and system are disclosed for processing a segmented data set. The method includes the steps of receiving a data structure storing a plurality of values segmented into a plurality of sequences; assigning a plurality of processing elements to process the plurality of values; and processing the plurality of values by the plurality of processing elements according to a merge-based algorithm. Each processing element in the plurality of processing elements identifies a portion of values in the plurality of values allocated to the processing element based on the merge-based algorithm. In one embodiment, the processing elements are threads executed in parallel by a parallel processing unit.

BRIEF DESCRIPTION OF THE DRAWINGS

FIGS. 8A through 8C are conceptual illustrations of a merge-based SpMV algorithm, in accordance with one embodiment;

DETAILED DESCRIPTION

Computational algorithms for processing segmented data sets are typically implemented on systems having a plurality of processing elements. These processing elements may be organized hierarchically. For example a system may comprise a plurality of nodes, each node including at least one processor. Each node may include a parallel processing unit having a number of cores. Each core may conduct one or more threads of execution. Each thread may be assigned a portion of the data set to process. The processed portions may then be combined to produce a result.

For example, many numerical algorithms include a step for the generation of sparse matrix vector products (SpMV). A matrix A having N rows and M columns is multiplied by a vector $\hat{x}$ to produce a result vector in the form of $\hat{y}=A\hat{x}$. It will be appreciated that many rows of the matrix A may be sparsely populated while other rows may have many non-zero values. To avoid the expenditure of storage for zero-valued data, common practice is to encode the matrix A using a format that efficiently stores all the non-zero values of the matrix A in a manner in which the location of each value may be decoded. Example formats that have been utilized are the Coordinate, Compressed Sparse Row (CSR), and ELLPACK formats. Such formats reduce the bandwidth required to transmit the matrix values between processors.

Many such formats are organized as sequences of sequences. For example, CSR is organized as a segmented list of non-zero values, one segment per row. A conventional technique for generating SpMV may include the steps of assigning each segment of the matrix to a particular thread to multiply by the vector x̂ to produce a scalar value in the result vector ŷ. However, balancing the workload between processing elements based on segmentation solutions associated with these formats has proven challenging.

As described in more detail herein, a work-efficient parallelization technique that achieves workload balance for segmented computations may be employed in these types of algorithms (i.e., algorithms that are coarsely organized by the consumption of a sequence of data sequences). Although the technique is illustrated in the context of segmented reduction for SpMV, the technique may be implemented with different types of algorithms such as sparse graph and list-processing algorithms.

Figure 1:
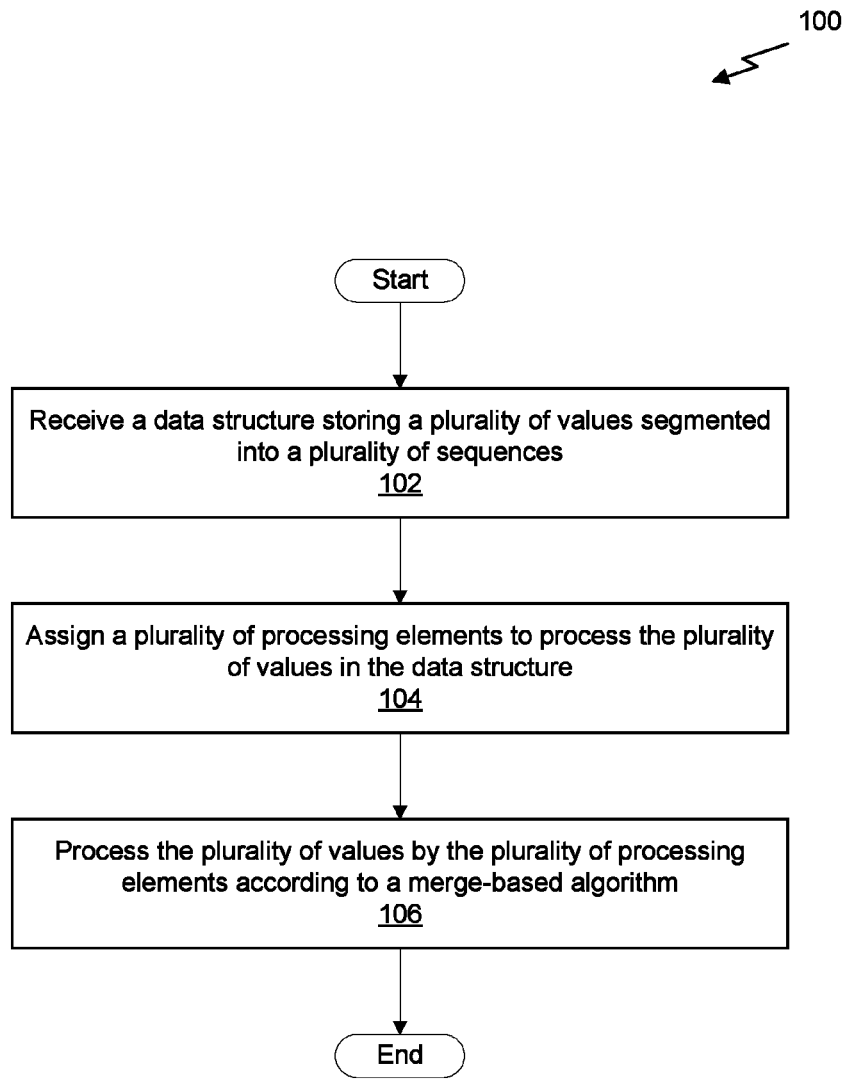
FIG. 1 illustrates a flowchart of a method for processing a segmented data set utilizing a merge-based algorithm, in accordance with one embodiment.

FIG. 1 illustrates a flowchart of a method 100 for processing a segmented data set utilizing a merge-based algorithm, in accordance with one embodiment. At step 102, a data structure storing a plurality of values segmented into a plurality of sequences is received. In other words, the data encoded in the data structure represents a sequence of sequences, with each sequence comprising an ordered list of zero or more values, where the plurality of sequences are arranged in an ordered list of sequences. It will be appreciated that the order of values in each sequence may be arbitrary; i.e., all values in a particular sequence do not need to be arranged in an increasing or decreasing order based on a magnitude of the value. The data structure may be stored in a memory associated with a processor. In one embodiment, the data structure is a compressed representation of a sparse matrix utilized to generate a dense output vector based on sparse matrix vector multiplication (SpMV). In another embodiment, the computation is a breadth-first search (BFS) and the data structure is a representation of a graph describing relationships (edges) between entities (vertices) in the graph. In yet another embodiment, the computation is a divide-and-conquer sorting algorithm and the data structure is a list of independent data sequences to be partitioned further into smaller sequences.

At step 104, a plurality of processing elements is assigned to process the plurality of values in the data structure. In one embodiment, each processing element is a thread of execution. A processor may be configured to generate and execute the plurality of threads. In one embodiment, a thread group (i.e., a warp) in a parallel processing unit is generated to process the values in the data structure. For example, a warp of 32 threads may be configured to process 32 values in the plurality of values in parallel. In another embodiment, a plurality of threads in a multi-threaded CPU is configured to process the values. In another embodiment, each processing element is a processor executing a single thread of execution. In yet another embodiment, each processing element is a node in a distributed processing system, where each node comprises a processor and a memory. A node may also be a virtual machine.

At step 106, the plurality of values is processed by the plurality of processing elements according to a merge-based algorithm. Each processing element in the plurality of processing elements is configured to identify a portion of values in the plurality of values allocated to the processing element based on the merge-based algorithm. The portion may include values in one or more sequences in the data structure.

In one embodiment, the merge-based algorithm is an algorithm that equally distributes the work-load associated with processing the plurality of values. The merge-based algorithm merges the plurality of values with a list of descriptors for the plurality of sequences and equally divides the merged elements between the available processing elements for processing. In another embodiment, the merging step is never actually realized, but rather conducted so far as to logically identify the subsequences of descriptors and values that should be assigned to each processing element. In other words, the merging step is implemented by calculating which values and/or descriptors are assigned to each processing element based on the totality of the values and descriptors.

For example, in the case of SpMV, the merge-based algorithm may be implemented such that each thread in a plurality of threads processes an equal number (or approximately equal number) of a combination of non-zero values of the sparse matrix combined with rows of the sparse matrix. Some threads may process more non-zero values than rows and other threads may process more rows than non-zero values, but each thread processes approximately the same number of rows and non-zero values, combined, as the other threads. In other words, the merge-based algorithm does not segment the sparse matrix by rows or by non-zero values, but instead segments the sparse matrix both by row and non-zero value. Processing the sparse matrix in this manner more equally divides the workload among the plurality of threads when compared to conventional techniques of parallelizing this type of algorithm.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
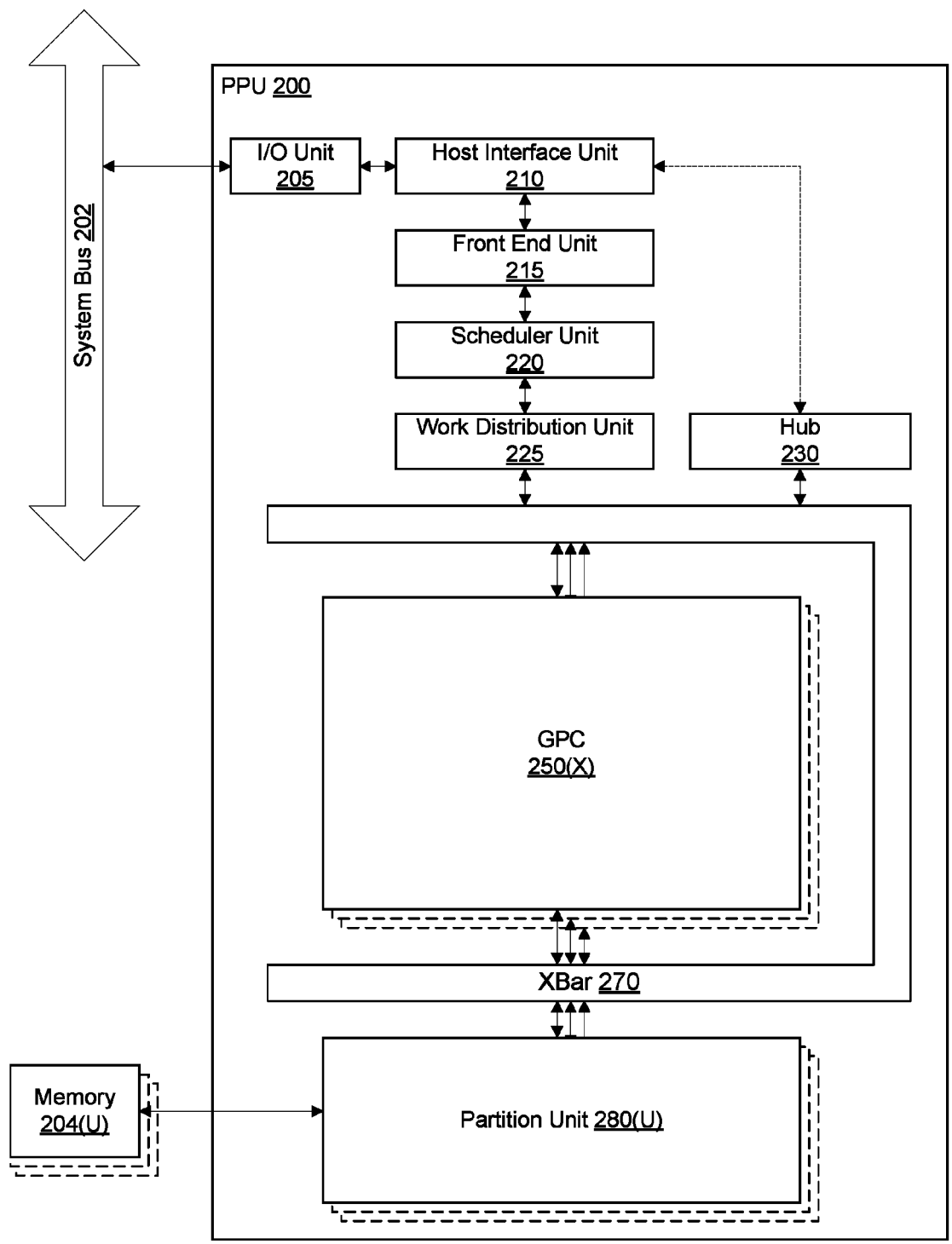
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
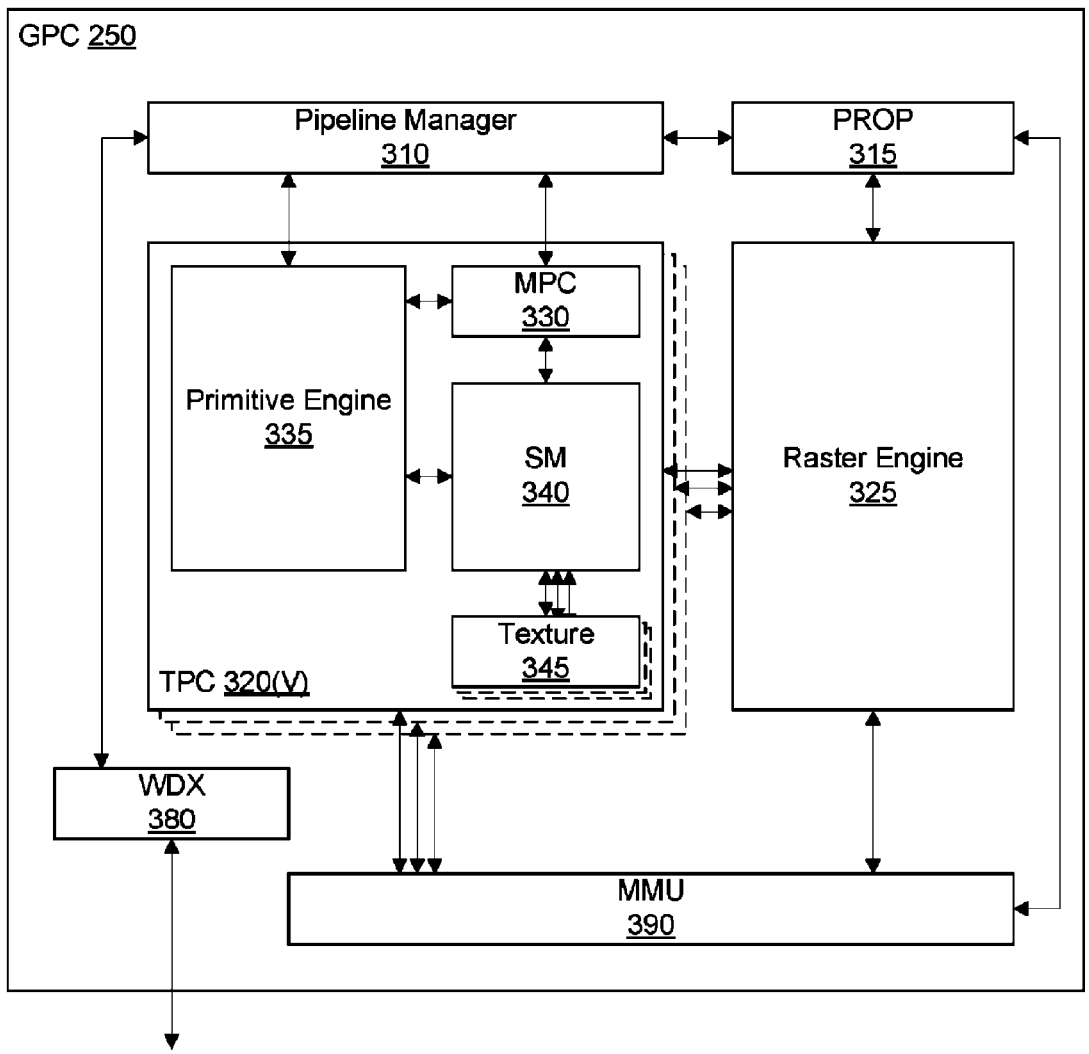
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
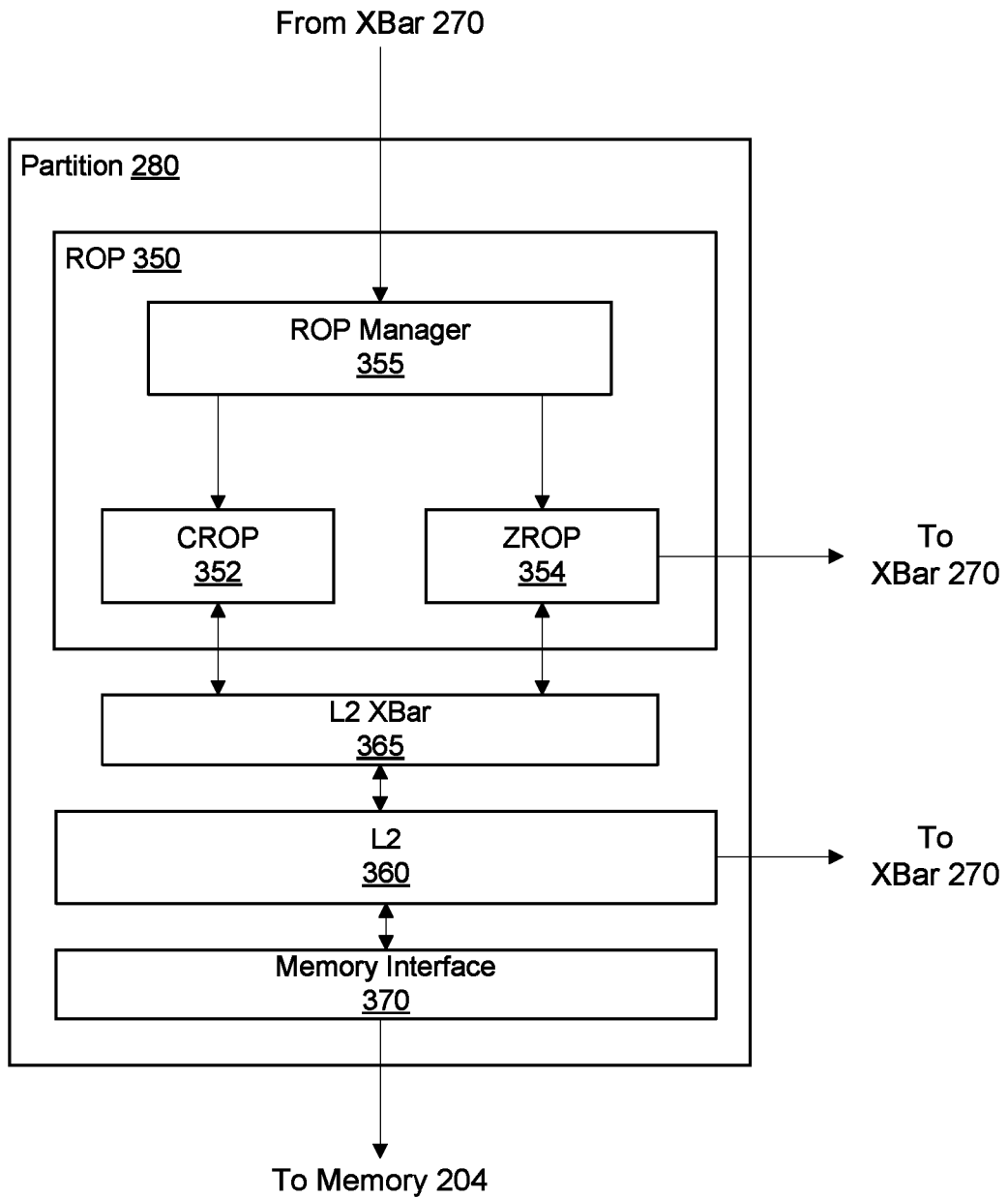
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
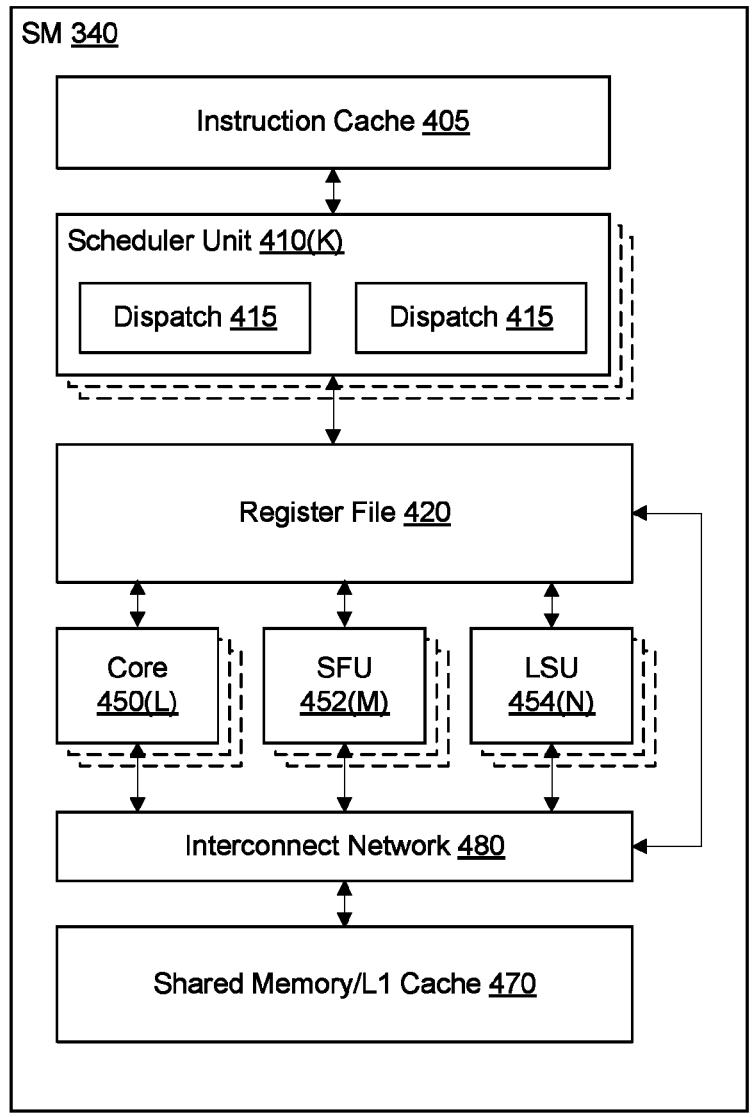
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
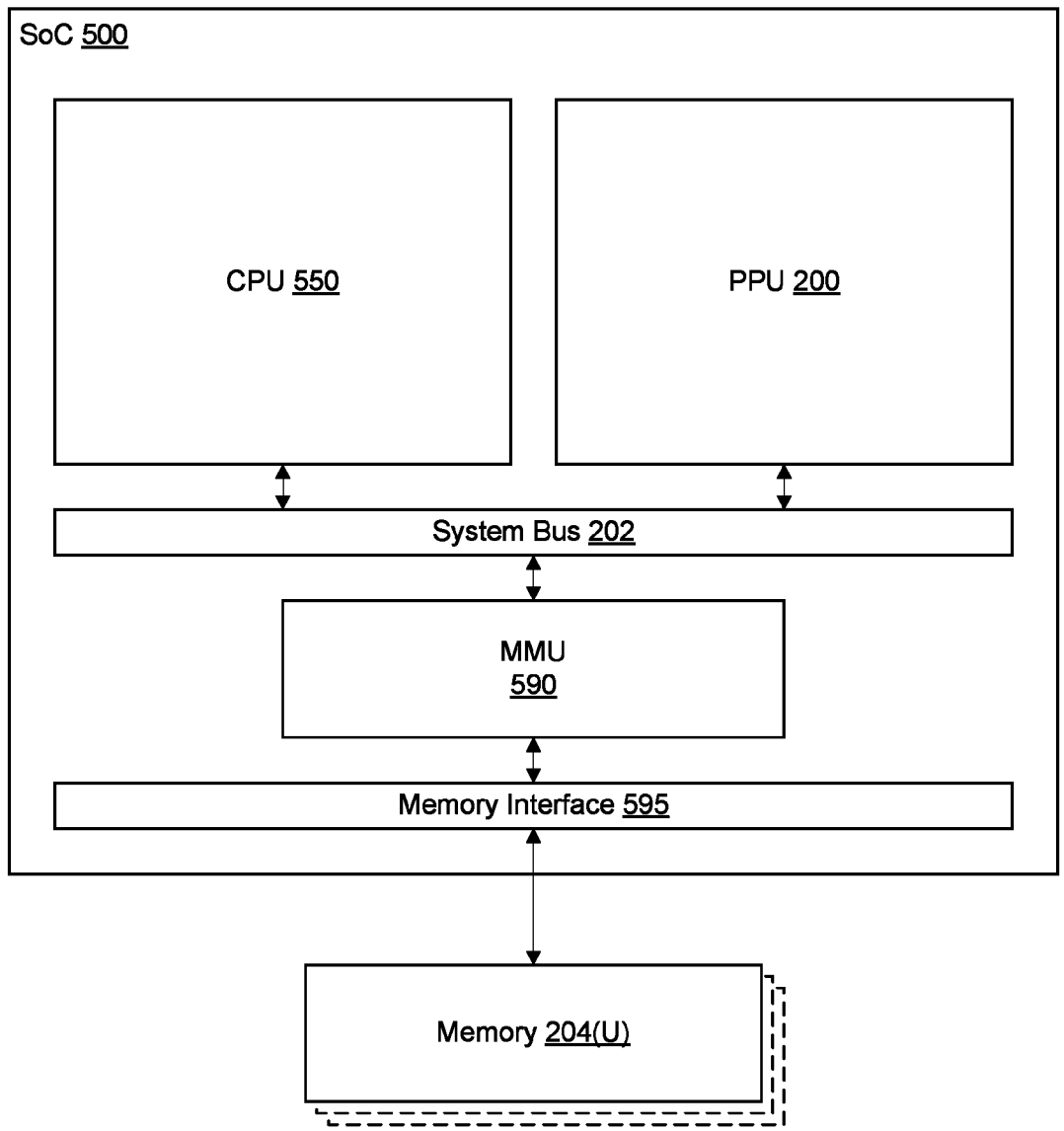
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
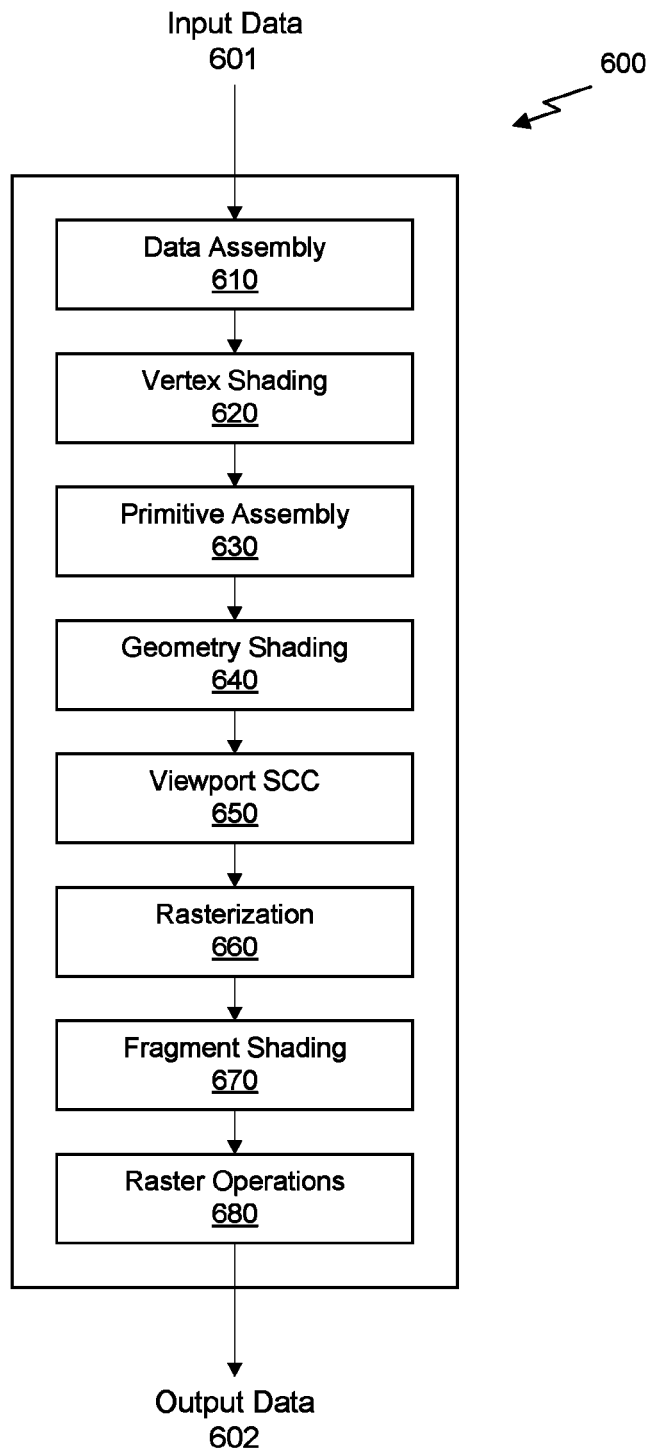
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Sparse Matrix Vector Multiplication

Again, segmented data sets that represent a sequence of sequences may be processed according to a merge-based algorithm that divides the workload evenly among a plurality of processing elements. One such algorithm is illustrated below within the context of a parallel SpMV algorithm. It will be appreciated that the parallel SpMV algorithm is merely one example merge-based algorithm for processing a segmented data set. Other types of algorithms that implement the merge-based approach are contemplated as being within the scope of the present disclosure.

SpMV is used frequently in scientific and engineering applications. It is of particular importance in iterative methods for solving sparse linear systems, eigenvalues systems, and similar problems. Iterative methods for solving large linear systems ($A\hat{x}=\hat{b}$) and eigenvalue problems ($A\hat{x}=\lambda\hat{x}$) generally require hundreds if not thousands of matrix-vector products to reach convergence. Other notable applications include approximating systems of partial differential equations and the training of convolution neural networks.

Figures 7A, 7B:
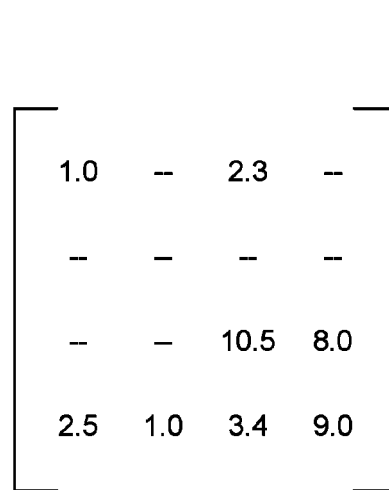
FIG. 7A illustrates a sparse matrix, in accordance with one embodiment.
FIG. 7B illustrates the sparse matrix of FIG. 7A encoded in the Compressed Sparse Row (CSR) format, in accordance with one embodiment.

FIG. 7A illustrates a sparse matrix 700, in accordance with one embodiment. As shown in FIG. 7A, the matrix 700 includes a plurality of scalar values arranged in N rows and M columns (i.e., an N×M matrix). In one embodiment, the matrix 700 may be a square matrix such that N is equal to M. In other embodiments, the number of columns is not equal to the number of rows (i.e., N≠M). In some such embodiments, the number or rows may be orders of magnitude greater than or less than the number of rows.

The matrix 700 is referred to as a sparse matrix because most of the values in the matrix are zero. It will be appreciated that the matrix 700 is shown with four rows and four columns. The size of the matrix 700 is for purposes of illustration as the size of the matrix in real-world applications is typically many orders of magnitudes larger. For example, the matrix 700 may have millions of rows and millions of columns. Storing these matrices in a trivial fashion (i.e., one 64-bit floating point value per element of the matrix) would require a huge amount of memory. For example, a social network of 2015 U.S. citizens would comprise a matrix of approximately 300 million by 300 million elements, and the storage requirements would be greater than 722 petabytes. Since a large percentage of the encoded values for the matrix are zero, more efficient solutions have been developed to store the matrix 700 in a memory.

For example, a general-purpose representation is the Coordinate format, which stores an index-value tuple for each non-zero value. In other words, an integer row index, an integer column index, and a floating-point value for each non-zero element are stored in a one dimensional array to represent the matrix. However, this format has relatively high storage overhead due to the repeated use of two indices for every non-zero value.

In another example, the Compressed Sparse Row (CSR) format reduces the storage overhead associated with the Coordinate format by storing all non-zero values in a first array in row major order. A second array stores the corresponding column indices for each of the non-zero values, and a third array stores the row offsets associated with the first two arrays such that the entries of row i in the first and second array occupy the half-open interval [row-offsets$_i$, row-offsets$_{i+1}$). If a difference between row-offsets$_{i+1}$ and row-offsets$_i$ is equal to zero, then there are no entries in the $i^{th}$ row of the matrix. Storage overhead is saved where there are fewer rows than non-zero values since the number of entries of the third array storing row offsets associated by each row is smaller than an array storing row indices for each non-zero value.

FIG. 7B illustrates the sparse matrix 700 of FIG. 7A encoded in the Compressed Sparse Row (CSR) format, in accordance with one embodiment. As shown in FIG. 7B, the matrix 700 may be encoded in three arrays: a first array 710 (Values[ ]) that stores the non-zero values of the matrix 700 in row major order; a second array 720 (Column_idx[ ]) that stores the column indices for each of the non-zero values of the matrix 700; and a third array 730 (Row_offsets[ ]) that stores a descriptor for each row of the matrix 700. The first array 710 and the second array 720 are of size nnz, which equals the number of non-zero values in the matrix 700. The third array 730 is of size N+1, where N is the number of rows in the matrix 700.

As shown in FIG. 7B, the third array 730 stores the offset into the first array 710 and the second array 720 for the first entry in each row of the matrix 700. For example, the Row_offsets[3] is equal to 4 and indicates that the first non-zero entry in the fourth row of matrix 700 is stored in Values[4] with an associated column index in Column_idx [4]. Again, the third array 730 also may be used to indicate whether a row includes at least one non-zero entry by checking whether Row_offsets[i] is equal to Row_offsets [i+1]. For example, Row_offsets[1] is equal to Row_offsets [2], which indicates that the second row of the matrix 700 does not include any non-zero values.

In one embodiment, the size of the third array 730 may be reduced by one by storing an implicit offset. For example the first entry of the third array 730 may be associated with an offset corresponding to the second row of the matrix 700 since the offset corresponding to the first row of the matrix 700 will always be zero (i.e., non-zero values corresponding to the first row of the matrix 700 will be stored in the first array 710 and the second array 720 starting at the first element of the arrays).

Other formats for storing the sparse matrices are well-known in the art and within the scope of the present disclose. For example, a similar scheme can be used to encode the values of the matrix in column-major order (i.e., the compressed sparse column, or CSC, format. The technique disclosed herein will be illustrated in the context of the CSR format for sparse matrix encoding.

A conventional sequential SpMV algorithm for calculating a result vector ŷ is provided in Table 1. As shown in Table 1, the algorithm is implemented in two nested loops where each row is processed sequentially in an outer loop and each non-zero value in a particular row is multiplied by a corresponding value in the input vector 2 in an inner loop to accumulate a result in a corresponding value in the result vector ŷ.

TABLE 1

```
for (int row = 0; row < A.m; ++row) {
    y[row] = 0.0;
    for (int ns = A.row_offsets[row];
            ns < A.row_offsets[row + 1];
            ++ns) {
        y[row] += A.values[ns] * x[A.column_idx[ns]];
    }
}
```

The sequential SpMV algorithm, shown above, is typically parallelized in one of two ways. In a first technique, a parallel SpMV algorithm may be implemented by processing each row of the matrix independently by a different thread. Each thread in a plurality of threads may be assigned a particular row or rows of the matrix. However, it will be appreciated that segmenting a sparse matrix by row may not result in an equal distribution of the workload among the plurality of threads. For example, as shown in FIG. 7A, the first and third rows of the matrix 700 each include two non-zero values, whereas the second row of the matrix 700 includes zero non-zero values and the fourth row of the matrix 700 includes four non-zero values. If four threads are utilized to process the matrix 700, then the thread assigned to the second row will be idle, while the thread assigned to the fourth row will perform twice as much processing as the threads assigned to the first and third rows.

In a second technique, the non-zero values may be segmented among threads. In other words, each thread will be assigned an equal (or approximately equal) portion of the non-zero values. While this technique balances the non-zero values among threads, it may not equally divide the overall workload. One issue is that each thread still needs to figure out which non-zero values assigned to the thread belong to particular rows. This requires a search of the Row_offsets array 730. Imbalance is still possible because some portions of non-zero values may span many more rows than other portions of non-zero values, and threads associated with larger spans of rows will perform additional processing when tracking the progress through the Row_offsets array 730. This can be quite common where a matrix includes many "empty" rows that do not include any non-zero values.

Therefore, a more efficient segmentation solution of the matrix 700 is desired to equally distribute the workload to multiple threads in a parallel fashion. At the heart of this solution is the idea that a single step performed by each thread involves either: (i) calculating a fused-multiply-add operation (i.e., multiplying a non-zero value of the matrix with a value in the input vector 2 and accumulating the result of the multiplication with other such products in the same row), or (ii) writing out the accumulated result for a row into the result vector ŷ and transitioning to the next row of the matrix.

FIGS. 8A through 8C are conceptual illustrations of a merge-based SpMV algorithm, in accordance with one embodiment. In general, the parallel decomposition of the merge-based SpMV algorithm can be viewed as the equitable partitioning of a decision path in which progressively larger elements are consumed from two lists. The two merged lists consist of a first list that includes the sequence descriptors and a second list that includes a sequence of indices into the plurality of values in the sequences. As shown in FIG. 8A, the decision path can be visualized as a two-dimensional grid with elements of the first list arranged on the x-axis and elements of the second list arranged along the y-axis.

The decision path may be generated sequentially by setting two index values (i, j) equal to zero. The i index represents an index into the first list on the x-axis. The j index represents an index into the second list on the y-axis. At each point in the decision path, one of the elements from either the first list or second list will be consumed and the corresponding index i or j will be incremented to trace out the decision path on the grid. The decision on which element should be consumed may be made by comparing the value of A[i], referred to herein as $A_i$, to the value of B[j], referred to herein as $B_j$, where A is the first list and B is the second list.

In the case of the parallel SpMV algorithm utilizing the CSR data structure, the decision path may represent a merged list that combines the offsets in the Row_offsets array 730 with the indices into the Values array 710 and Column_idx array 720, in increasing order. It will be appreciated that the first offset in the Row_offsets array 730 is always equal to 0 (i.e., the index of the first element in the Values array 710 associated with the first row of the matrix 700). Therefore, in one embodiment, the first list does not include the first offset as that offset will always be the first element consumed in the decision path. Thus, the point p(0,0) inherently refers to a first point in the decision path in which the first offset has been consumed from the first list. Thus, $A_i$ refers to the value of Row_offsets[i+1] that will be compared against $B_j$, which refers to the value of nz_indices [j]. The nz_indices array refers to an array of values where each value in the array is a number in the sequence of natural numbers ℕ from 0 to nnz, in increasing order. In other words, the value of nz_indices[j] is equal to j.

For example, at point p(0,0) in the decision path, the value of $A_0$ (i.e., Row_offsets[1]=2) is compared to the value of $B_0$ (i.e., nz_indices[0]=0). If the value of $A_i$ is greater than the value of $B_j$, then an element from the second list is consumed and the index j is incremented; otherwise, an element from the first list is consumed and the index i is incremented. Because $A_0$=2 is greater than $B_0$=0, an element from the second list (i.e. nz_indices[0]) is consumed and the index j is incremented. At point p(0,1) in the decision path, the value of $A_0$=2 is compared to the value of $B_1$=1, and an element from the second list (i.e., nz_indices[1]) is consumed and the index j is incremented. At point p(0,2) in the decision path, the value of $A_0$=2 is compared to the value of $B_2$=2. Because $A_i$ is not greater than (i.e., less than or equal to) $B_j$ at point p(0,2), an element from the first list (i.e., Row_offsets[1]) is consumed and the index i is incremented. The decision path is generated in this fashion until all elements of both lists have been consumed.

The goal of the parallel merge-based SpMV algorithm is to equally divide the workload associated with the number of sequences and the number of values, combined, between the available threads or processing elements. By dividing the decision path into equal length segments, using a number of segments equal to the number of available threads, the workload may be evenly divided among the threads. In the case of three threads, the decision path will be divided into three equal length segments. It will be appreciated that sometimes the number of elements in both lists cannot be evenly divided by the number of threads. In such cases, some threads may receive an unequal workload; however, the uneven distribution should be minimized such that the length of segments assigned to each thread only varies by one step size.

It will be appreciated that the fundamental insight into the merge-based SpMV algorithm is that each point in the decision path can be found independently by performing a two-dimensional binary search across diagonals. More specifically, there is exactly one point in the decision path on each diagonal k (k=i+j), where any portion of the decision path between a point on one diagonal $k_l$ to a point on another diagonal $k_m$ has a length s equal to the difference between diagonals (i.e., $s=k_m-k_l$). Consequently, it is possible to search the points along a particular diagonal k to find the point at which $A_i$ is greater than $B_j$. The values along the left-hand and bottom side of the grid are arranged next to a starting point in the grid for the corresponding diagonal. As shown, the grid includes thirteen diagonals, labeled 0 through 12.

In one embodiment, the point on the decision path that intersects with diagonal k can be found via a constrained binary search along that diagonal. The binary search determines the first point p(i,j) on the diagonal k where $A_i$ is greater than all the items in the second list consumed before $B_j$. As a result, points in the decision path along the splits made for each thread can be found independently without knowing the path taken up to that point.

As shown in FIG. 8B, the threads (i.e., threads to, $t_1$, and $t_2$) can search along a particular diagonal (e.g., k=0, 4, 8, etc.) to find the point in the decision path at which that thread may start processing the values. For example, the first thread, to, searches along the path k=0 to find point p(0,0) at which the decision path begins for the first thread. The second thread, $t_1$, searches along the path k=4 to find point p(2,2) at which the decision path begins for the second thread. The third thread, $t_2$, searches along the path k=8 to find point p(3,5) at which the decision path begins for the third thread. Each thread may also search along a diagonal assigned to the next thread to find a point in the decision path at which that thread may stop processing values. For example, the first thread, $t_0$, searches along the path k=4 to find point p(2,2) at which the decision path begins for the first thread. The second thread, $t_1$, searches along the path k=8 to find point p(3,5) at which the decision path begins for the second thread. The third thread, $t_2$, searches along the path k=12 to find point p(4,8) at which the decision path ends for the third thread.

A binary search is performed on a diagonal k in the range $[p(i_{min}, j_{max}), p(i_{max}, j_{min})]$, inclusive, where a pivot point within the range is determined that splits the range in half. The range may be determined for each thread based on the lengths of the two lists and an index associated with each thread. Then, $A_i$ and $B_j$ are determined for the pivot point. If $A_i$ is greater than $B_j$, then a new pivot point in the lower half of the range, inclusive of the previous pivot point, is searched, or, if $A_i$ is less than or equal to $B_j$, then a new pivot point in the upper half of the range, exclusive of the pivot point, is searched.

Table 2 illustrates pseudocode for a MergePathSearch function that illustrates the binary search concept described above. The inputs to the MergePathSearch function are two iterators, a and b, along with a length of a, a_len, and a length of b, b_len, plus a value of the diagonal to search across.

TABLE 2

```
int x_min = max(diagonal - b_len, 0);
int x_max = min(diagonal, a_len);
while (x_min < x_max) {
    OffsetT pivot = x_min + x_max >> 1;
    if (a[pivot + 1] > b[diagonal - pivot]) {
        x_max = pivot;
    } else {
        x_min = pivot + 1;
    }
}
return CoordinateT(min(x_min, a_len),
              diagonal - x_min);
}
```

For example, $A_i$ and $B_j$ for pivot point p(2,2) may be tested for the second thread $t_1$. The pivot point may be determined by finding the point in the middle of the range of the diagonal being searched. For pivot point p(2,2), $A_i$ is equal to 4 and $B_j$ is equal to 2. Since $A_i$ is greater than $B_j$, the point in the decision path crosses the diagonal on the lower half of the range, inclusive of the pivot point p(2,2). The lower half of the range may then be tested in the same manner; e.g., pivot point p(1,3) is tested to determine that of 2 is less than $B_i$ of 3 so the pivot point is in the upper half of the previously tested range. It will be appreciated that after the second iteration of the while loop, x_min and x_max are both set equal to 2 and, therefore, the while loop condition causes the while loop to terminate and the returned coordinate is point p(2,2). The range for thread $t_2$ may be tested in a similar manner in parallel to find point p(3,5).

As shown in FIG. 8C, once each thread has identified a point in the decision path that intersects the thread's corresponding diagonal, the thread may begin processing the elements of the decision path assigned to that thread. For example, the thread starts at the point identified on the diagonal and determines whether the next element to be processed is in the first list or the second list. The element to be processed may be chosen by comparing $A_i$ with $B_j$. The thread continues to trace the decision path until the thread reaches the point on the decision path that crosses the next diagonal.

Table 3 illustrates pseudocode for a parallel SpMV function. The inputs to the SpMV function are a number of threads, num_threads, a matrix $B_j$, and a dense vector $\hat{x}$. The output of the SpMV function is a dense vector $\hat{y}$.

TABLE 3

```
int* row_end_offsets = A.row_offsets + 1;
CountingInputIterator<int> nz_indices(0);
int num_merge_items = A.num_rows + A.num_nonzeros;
int items_per_thread = (num_merge_items + num_threads - 1) /
                       num_threads;
int row_carry_out[num_threads];
double value_carry_out[num_threads];
#pragma omp parallel for schedule(static) num_threads(num_threads)
for (int tid = 0; tid < num_threads; tid++) {
    CoordinateT thread_coord, thread_coord_end;
    int diagonal = min(items_per_thread * tid, num_merge_items);
    int diagonal_end = min(diagonal + items_per_thread,
                       num_merge_items);
    thread_coord = MergePathSearch(diagonal, row_end_offsets,
                   nz_indices, A.num_rows, A.num_zero);
    thread_coord_end = MergePathSearch(diagonal_end,
                   row_end_offsets, nz_indices, A.num_rows,
                   A.num_zeros);
    double running_total = 0.0;
    for (; thread_coord.x < thread_coord_end.x; ++thread_coord.x) {
        for (; thread_coord.y < row_end_offsets[thread_coord.x];
             ++thread_coord.y) {
            running_total += A.values[thread_coord.y] *
                         x[A.column_indices[thread_coord.y]];
        }
```

TABLE 3-continued

```
        y[thread_coord.x] = running_total;
        running_total = 0.0;
    }
    for (; thread_coord.y < thread_coord_end.y; ++thread_coord.y) {
        running_total += A.values[thread_coord.y] *
                     x[A.column_indices[thread_coord.y]];
    }
    Row_carry_out[tid] = thread_coord_end.x;
    Value_carry_out[tid] = running_total;
}
for (int tid = 0; tid < num_threads - 1; ++tid) {
    if (Row_carry_out[tid] < A.num_rows) {
        y[Row_carry_out[tid]] += value_carry_out[tid];
    }
}
```

The merge-based SpMV algorithm shown in Table 3 populates the dense vector $\hat{y}$ with the dot products calculated by multiplying each row of the matrix A by the input vector $\hat{x}$. It will be appreciated that each thread operates independently, in parallel, calculating a starting and ending coordinate of the decision path in the grid assigned to that thread, generating partial dot products for the elements in each row associated with that segment of the decision path, and storing those partial dot products in the output vector $\hat{y}$. However, because values in particular rows can be split between two different threads, a final clean-up portion of the algorithm is performed sequentially by adding all the partial dot products calculated by each thread for the last row assigned to the thread to the partial dot products stored in vector $\hat{y}$ calculated by a different thread.

In another embodiment, the nested loops of the merge-based SpMV algorithm, shown above in Table 3, may be substituted with the following single loop, shown in Table 4, for efficient SIMD execution.

TABLE 4

```
double running_total = 0.0;
for (int i = 0; i < items_per_thread; ++i) {
    if (nz_indices[thread_coord.y] < row_end_offsets[thread_coord.x])
    {
        running_total += A.values[thread_coord.y] *
                     x[A.column_indices[thread_coord.y]];
        ++thread_coord.y;
    } else {
        y[thread_coord.x] = running_total;
        running_total = 0.0;
        ++thread_coord.x;
    }
}
```

The merge-based SpMV algorithm, shown above, relies on the MergePathSearch function to equally divide the decision path among a plurality of threads. In other words, each thread is assigned a portion of the decision path based on a thread index of the particular thread. The decomposition of the CSR formatted sparse matrix can be performed by merging the values in the Row_offsets array 730 with the sequence of natural numbers ℕ used to index the Values array 710 and the Column_idx array 720. By design, each contiguous vertical section of the decision path corresponds to a row of non-zero values in the sparse matrix A. As threads follow the decision path, the threads accumulate matrix-vector dot-products when moving downwards in the decision path. In contrast, when moving to the right in the decision path, the threads flush the accumulated values to the corresponding row output in the output vector $\hat{y}$ and reset the accumulated total. Again, the partial dot products from rows that span multiple threads can be aggregated in a subsequent reduce-value-by-key pass. The result is to always partition equal amounts of work across parallel threads, regardless of matrix structure or content.

Furthermore, the technique of merging sequence offsets into the sequence of natural numbers can be used to adapt any input-parallelizable function $f$ for segmented operation. The term "input-parallelizable" refers to a function where the input can be partitioned arbitrarily among parallel threads; e.g., parallel reduction, merge, sort, scan, etc. In the case of the merge-based SpMV algorithm, the function is a fused-multiply-add function.

In another embodiment, the function may be multi-level segmentation. In such cases, the merge grid may become N-dimensional. In the case of a single segment, merge-based decomposition is equivalent to even-share work distribution.

Figure 9:
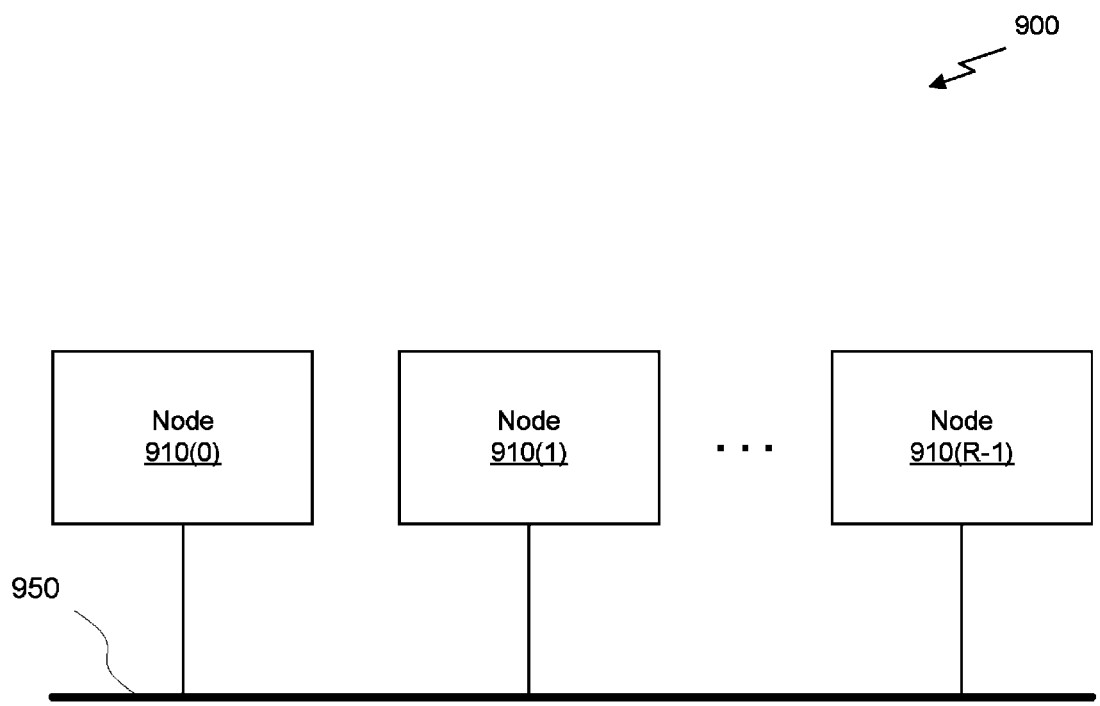
FIG. 9 illustrates a system configured to execute a merge-based SpMV algorithm, in accordance with one embodiment.

FIG. 9 illustrates a system 900 configured to execute a merge-based SpMV algorithm, in accordance with one embodiment. The system 900 includes a plurality of nodes 910. In one embodiment, each node 910 comprises a processor, such as PPU 200 or SoC 500, as well as memory (e.g., SDRAM, HDD, SSD, etc.). One or more nodes may be included in a computer or a server coupled to a network. Multiple computers or servers may communicate over the network to enable a plurality of nodes 910 to operate in parallel. In another embodiment, each node 910 may be implemented as a server blade, with server blades distributed in one or more racks in one or more data centers.

In yet another embodiment, each node 910 may refer to a virtual machine (VM) that emulates, via software, a particular set of hardware resources, such as the PPU 200 or SoC 500 as well as memory. Each VM may be executed on hardware accessible via a network. For example, Amazon Web Services (AWS®) provides virtual servers that may be utilized to process various applications using hardware hosted in Amazon® data centers. A virtual machine may be launched using such services provided over a network to dynamically generate the nodes of the system 900.

Each of the nodes 910 may be connected to a network 950 that enables data to be transmitted between the nodes 910. The network 950 may be a LAN, WAN, the Internet, or the like. In one embodiment, data may be transmitted between nodes 910 utilizing IP packets. The network 950 may be a wired network or a wireless network. For example, network 950 may adhere to the IEEE 802.3 Ethernet specification or the IEEE 802.11 Wireless LAN specification. In alternate embodiments, the network 950 may be a dedicated high-speed interface such as a PCIe interface that enables data to be transmitted between nodes 910 across a bus.

In one embodiment, the merge-based SpMV algorithm may be implemented on a single node that includes a multi-threaded processor. In the simplest implementation, a CPU may be multi-threaded, where each thread processes a corresponding portion of the decision path during that threads execution. It will be appreciated that each thread may be executed in a time-slice allocated manner. However, the merge-based SpMV algorithm may be more efficiently executed by executing the threads in parallel.

In another embodiment, a single node includes a parallel processor such as PPU 200. The merge-based SpMV algorithm may be executed by a plurality of threads in parallel across one or more TPCs 320 of the PPU 200. For example, a warp of 32 threads may be generated, with each of the 32 threads allocated a different portion of the decision path. The warp may be executed by a particular TPC 320 of the PPU 200. In another embodiment, multiple warps of 32 threads may be generated, with each warp executed by a different TPC 320 of the PPU 200. In yet another embodiment, a plurality of warps, each warp including 32 threads, may be generated, where each TPC 320 in a plurality of TPCs 320 executes multiple warps in the plurality of warps.

In yet another embodiment, multiple nodes may be communicatively coupled in order to implement the merge-based SpMV algorithm across a distributed system. For example, each node in a plurality of nodes may include a CPU and/or one or more PPUs 200 for executing a plurality of threads for processing the merge-based SpMV algorithm. Thus, different portions of the decision path may be processed on physically separate processors, with each processor executing a plurality of threads. In this manner, thousands or even millions of threads may be generated for processing the values in the sparse matrix across different nodes in parallel.

Figure 10:
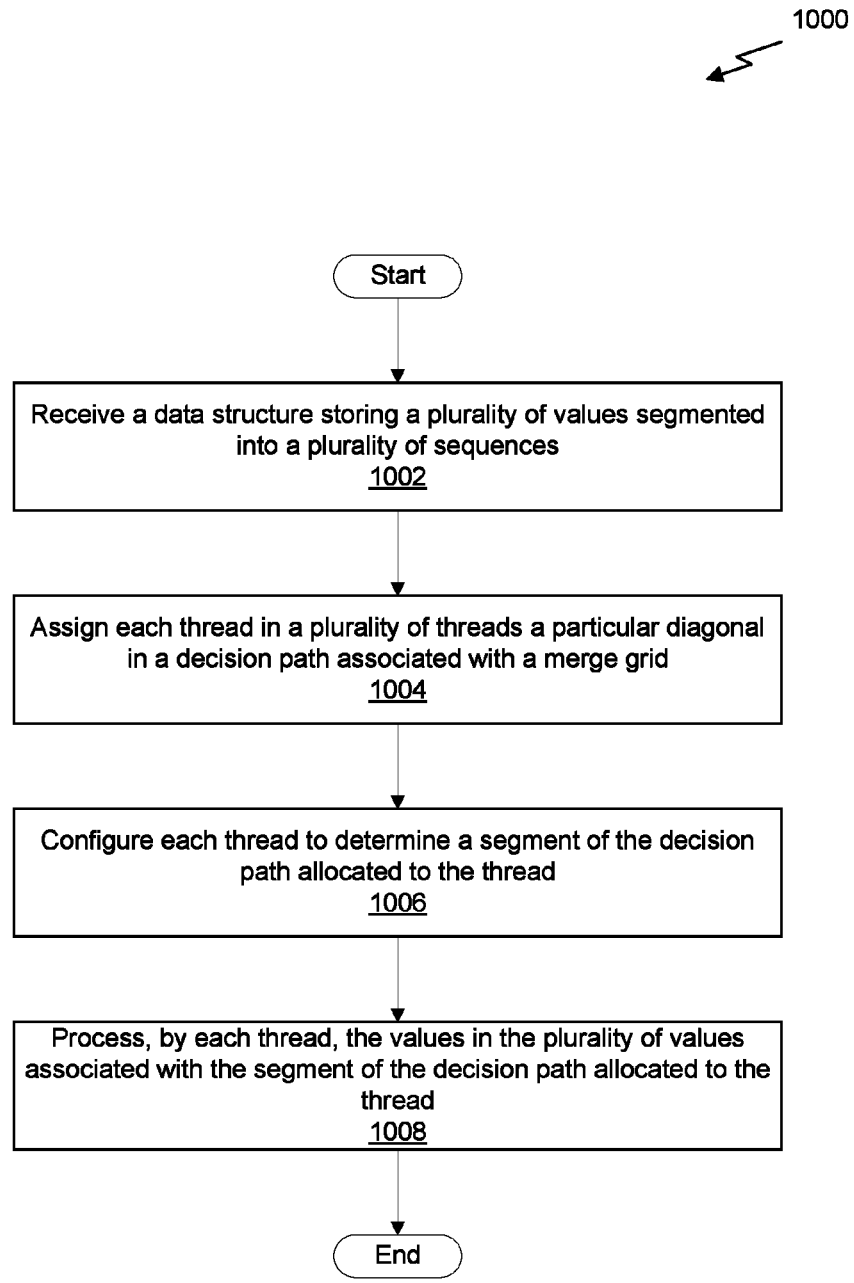
FIG. 10 illustrates a flowchart of a method for processing a segmented data set utilizing a merge-based algorithm, in accordance with another embodiment.

FIG. 10 illustrates a flowchart of a method 1000 for processing a segmented data set utilizing a merge-based algorithm, in accordance with another embodiment. At step 1002, a data structure storing a plurality of values segmented into a plurality of sequences is received. At step 1004, each thread in a plurality of threads is assigned a particular diagonal in a decision path associated with a merge grid. The merge grid represents a 2D grid with values of sequence descriptors along an x-axis and a sequence of natural numbers $\mathbb{N}$ along the y-axis. At step 1006, each thread is configured to determine a segment of the decision path allocated to the thread. The thread may identify the segment of the decision path assigned to that thread by finding a first point on the decision path that intersects a first diagonal and a second point on the decision path that intersects a second diagonal. The first diagonal represents a diagonal assigned to that thread and the second diagonal represents a diagonal assigned to the next thread. The point on a diagonal may be determined based on a constrained binary search of that diagonal. At step 1008, each thread processes the values in the plurality of values associated with that thread's allocated segment of the decision path.

Figure 11:
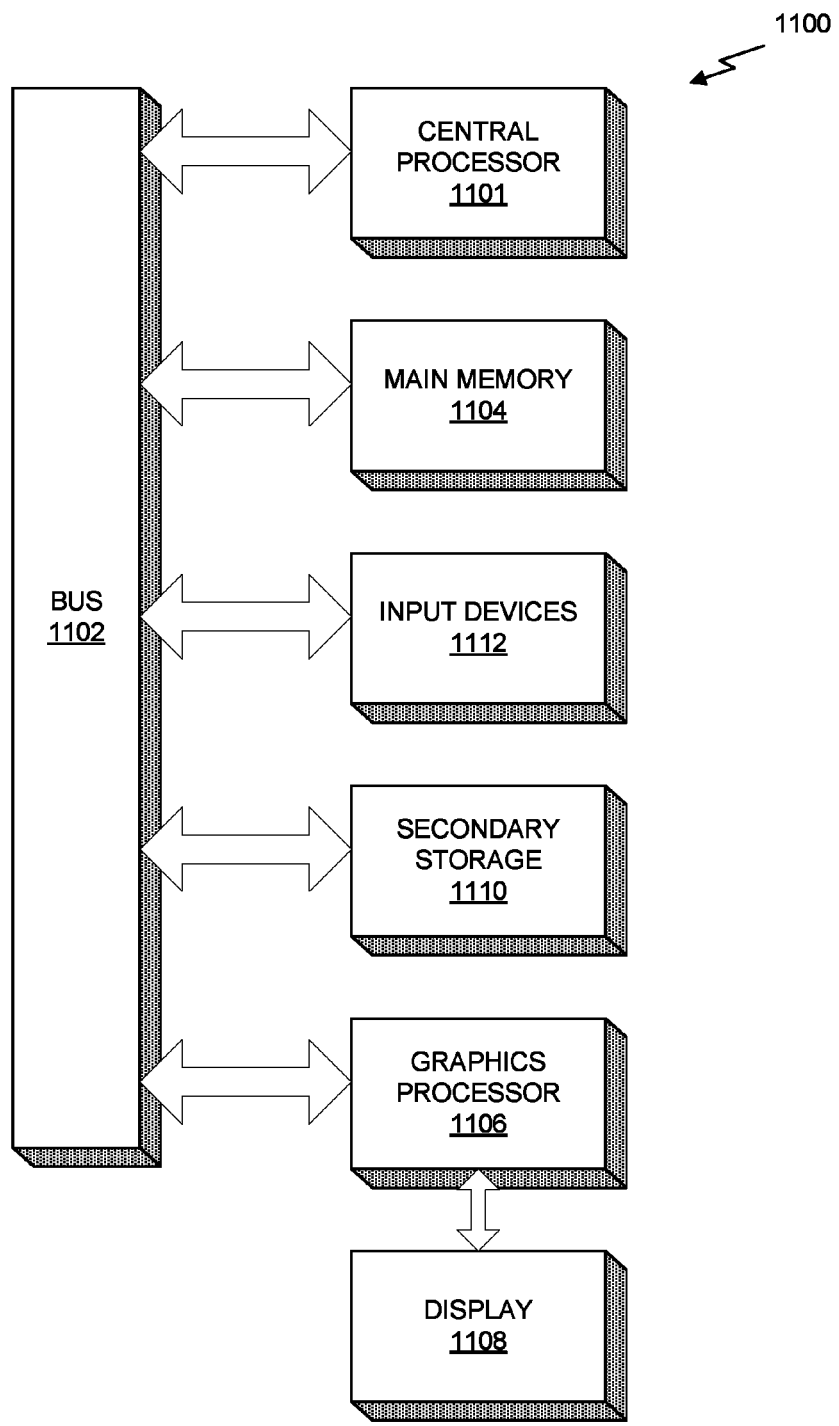
FIG. 11 illustrates an exemplary system in which the various architecture and/or functionality of the various previous embodiments may be implemented.

FIG. 11 illustrates an exemplary system 1100 in which the various architecture and/or functionality of the various previous embodiments may be implemented. As shown, a system 1100 is provided including at least one central processor 1101 that is connected to a communication bus 1102. The communication bus 1102 may be implemented using any suitable protocol, such as PCI (Peripheral Component Interconnect), PCI-Express, AGP (Accelerated Graphics Port), HyperTransport, or any other bus or point-to-point communication protocol(s). The system 1100 also includes a main memory 1104. Control logic (software) and data are stored in the main memory 1104 which may take the form of random access memory (RAM).

The system 1100 also includes input devices 1112, a graphics processor 1106, and a display 1108, i.e. a conventional CRT (cathode ray tube), LCD (liquid crystal display), LED (light emitting diode), plasma display or the like. User input may be received from the input devices 1112, e.g., keyboard, mouse, touchpad, microphone, and the like. In one embodiment, the graphics processor 1106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1100 may also include a secondary storage 1110. The secondary storage 1110 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1104 and/or the secondary storage 1110. Such computer programs, when executed, enable the system 1100 to perform various functions. The memory 1104, the storage 1110, and/or any other storage are possible examples of computer-readable media.

In one embodiment, the architecture and/or functionality of the various previous figures may be implemented in the context of the central processor 1101, the graphics processor 1106, an integrated circuit (not shown) that is capable of at least a portion of the capabilities of both the central processor 1101 and the graphics processor 1106, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1100 may take the form of a desktop computer, laptop computer, server, workstation, game consoles, embedded system, and/or any other type of logic. Still yet, the system 1100 may take the form of various other devices including, but not limited to a personal digital assistant (PDA) device, a mobile phone device, a television, etc.

Further, while not shown, the system 1100 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a data structure storing a plurality of values segmented into a plurality of sequences;
assigning a plurality of processing elements to process the plurality of values; and
processing the plurality of values by the plurality of processing elements according to a merge-based algorithm that equitably apportions the plurality of values across the plurality of processing elements by number of sequences and number of values to balance a workload based on a computational complexity associated with each value of the plurality of values apportioned to each of the plurality of processing elements, including:
each processing element in the plurality of processing elements-identifying a portion of values in the plurality of values allocated to the processing element based on the merge-based algorithm, and each processing element in the plurality of processing elements processing the identified portion of values allocated to the processing element.

2. The method of claim 1, wherein the data structure is a Compressed Sparse Row (CSR) data structure that represents a sparse matrix.

3. The method of claim 2, wherein the each processing element generates at least one partial dot product by multiplying at least one value in the plurality of values with a corresponding value of an input vector.

4. The method of claim 3, wherein at least one value in an output vector is generated by summing a first partial dot product generated by a first processing element with a second partial dot product generated by a second processing element.

5. The method of claim 1, wherein each processing element comprises a thread of execution configured to be executed by a parallel processing unit, and wherein two or more threads are executed substantially simultaneously on the parallel processing unit.

6. The method of claim 1, wherein the merge-based algorithm comprises a merge-based sparse matrix vector multiplication (SpMV) algorithm.

7. The method of claim 1, wherein the portion of values in the plurality of values allocated to the processing element is identified by:
determining a starting point in a segment of a decision path allocated to the processing element; and
determining an ending point in the segment of the decision path allocated to the processing element.

8. The method of claim 7, wherein the starting point is determined by performing a constrained binary search along a first diagonal of a merge grid to find the starting point on the first diagonal that intersects the decision path.

9. The method of claim 8, wherein the ending point is determined by performing a constrained binary search along a second diagonal of the merge grid to find the ending point on the second diagonal that intersects the decision path.

10. The method of claim 1, wherein the merge-based algorithm comprises a search by a group of processing elements, or on behalf of the group of processing elements, in order to find a starting point and/or an ending point of a path segment assigned to that group of processing elements.

11. The method of claim 1, wherein the plurality of values are segmented into a total number of sequences that is configured based on a number of processing elements in the plurality of processing elements that are assigned to process the plurality of values, and wherein each sequence of the plurality of sequences is configured to have a number of values that at most varies by one step size.

12. A non-transitory computer-readable storage medium storing instructions that, when executed by a processor, cause the processor to perform steps comprising:
receiving a data structure storing a plurality of values segmented into a plurality of sequences;
assigning a plurality of processing elements to process the plurality of values; and
processing the plurality of values by the plurality of processing elements according to a merge-based algorithm that equitably apportions the plurality of values across the plurality of processing elements by number of sequences and number of values to balance a workload based on a computational complexity associated with each value of the plurality of values apportioned to each of the plurality of processing elements including:
wherein each processing element in the plurality of processing elements identifying a portion of values in the plurality of values allocated to the processing element based on the merge-based algorithm, and each processing element in the plurality of processing elements processing the identified portion of values allocated to the processing element.

13. The non-transitory computer-readable storage medium of claim 12, wherein the data structure is a Compressed Sparse Row (CSR) data structure that represents a sparse matrix.

14. The non-transitory computer-readable storage medium of claim 12, wherein the each processing element generates at least one partial dot product by multiplying at least one value in the plurality of values with a corresponding value of an input vector.

15. The non-transitory computer-readable storage medium of claim 12, wherein each processing element comprises a thread of execution configured to be executed by a parallel processing unit, and wherein two or more threads are executed substantially simultaneously on the parallel processing unit.

16. The non-transitory computer-readable storage medium of claim 12, wherein the portion of values in the plurality of values allocated to the processing element is identified by:
determining a starting point in a segment of a decision path allocated to the processing element; and
determining an ending point in the segment of the decision path allocated to the processing element.

17. The non-transitory computer-readable storage medium of claim 16, wherein the starting point is determined by performing a constrained binary search along a first diagonal of a merge grid to find the starting point on the first diagonal that intersects the decision path, and wherein the ending point is determined by performing a constrained binary search along a second diagonal of the merge grid to find the ending point on the second diagonal that intersects the decision path.

18. A system, comprising:
a memory storing a data structure that includes a plurality of values segmented into a plurality of sequences; and
a processor coupled to the memory and configured to:
assign a plurality of processing elements to process the plurality of values, and
process the plurality of values by the plurality of processing elements according to a merge-based algorithm that equitably apportions the plurality of values across the plurality of processing elements by number of sequences and number of values to balance a workload based on a computational complexity associated with each value of the plurality of values apportioned to each of the plurality of processing elements, including:
wherein each processing element in the plurality of processing elements identifying a portion of values in the plurality of values allocated to the processing element based on the merge-based algorithm, and
each processing element in the plurality of processing elements processing the identified portion of values allocated to the processing element.

19. The system of claim 18, wherein the portion of values in the plurality of values allocated to the processing element is identified by:
determining a starting point in a segment of a decision path allocated to the processing element; and
determining an ending point in the segment of the decision path allocated to the processing element, wherein the starting point is determined by performing a constrained binary search along a first diagonal of a merge grid to find the starting point on the first diagonal that intersects the decision path, and wherein the ending point is determined by performing a constrained binary search along a second diagonal of the merge grid to find the ending point on the second diagonal that intersects the decision path.

20. The system of claim 18, further comprising a second processor communicatively coupled to the first processor via a network, the second processor configured to:
assign a plurality of additional processing elements to process the plurality of values, and process the plurality of values by the plurality of additional processing elements according to a merge-based algorithm, wherein each processing element in the plurality of additional processing elements identifies a different portion of values in the plurality of values allocated to the processing element based on the merge-based algorithm.

* * * * *

UNITED STATES PATENT AND TRADEMARK OFFICE
CERTIFICATE OF CORRECTION

PATENT NO. : 9,928,034 B2
APPLICATION NO. : 14/971999
DATED : March 27, 2018
INVENTOR(S) : Duane George Merrill, III It is certified that error appears in the above-identified patent and that said Letters Patent is hereby corrected as shown below:

In the Claims

At Column 25, Claim number 12, Line number 7, delete "wherein".

At Column 26, Claim number 18, Line number 13, delete "wherein".

Signed and Sealed this
Sixth Day of November, 2018

Andrei Iancu
*Director of the United States Patent and Trademark Office*